United States Patent [19]

Varadhachary

[11] 4,337,296

[45] Jun. 29, 1982

[54] METHODS FOR BONDING DISSIMILAR SYNTHETIC POLYMERIC MATERIALS AND THE PRODUCTS INVOLVED IN AND RESULTING FROM SUCH METHODS

[75] Inventor: Seevaram N. Varadhachary, Newtown, Pa.

[73] Assignee: Congoleum Corporation, Kearny, N.J.

[21] Appl. No.: 180,800

[22] Filed: Aug. 25, 1980

[51] Int. Cl.[3] ........................ B32B 27/40; B32B 27/30

[52] U.S. Cl. .............................. 428/420; 204/159.16; 204/159.19; 427/54.1; 427/302; 427/333; 427/372.2; 428/423.3; 428/424.4; 428/424.6; 428/424.8; 428/522

[58] Field of Search ............... 428/424.4, 424.6, 424.8, 428/420, 423.3, 522; 427/333, 302, 54.1, 372.2; 204/159.16, 159.19

[56] References Cited

U.S. PATENT DOCUMENTS

| | | | |
|---|---|---|---|
| 3,959,521 | 5/1976 | Suetsugi | 427/44 |
| 4,070,398 | 1/1978 | Lu | 428/424.4 |
| 4,180,615 | 12/1979 | Bettoli | 428/424.6 |
| 4,214,208 | 7/1980 | Shortway | 428/522 |
| 4,216,267 | 8/1980 | Lorenz | 428/424.6 |
| 4,217,385 | 8/1980 | Shortway | 428/522 |

*Primary Examiner*—Ellis P. Robinson
*Attorney, Agent, or Firm*—Richard T. Laughlin

[57] ABSTRACT

A method of improving the bond between dissimilar polymeric materials, such as, for example, a vinyl resin material and a polyurethane or acrylated polyurethane resin material, which comprises: including in the vinyl resin material an acrylate or an acrylated urethane; providing in the polyurethane or acrylated polyurethane resin material an organic peroxide or other UV or thermal activated free radical initiators; bringing the vinyl resin material and the polyurethane or acrylated polyurethane resin material into contact; and exposing the vinyl resin material and the polyurethane or acrylated polyurethane resin material, while in contact, to curing conditions in the presence of said organic peroxide or other UV or thermal activated free radical initiators, whereby there is sufficient chemical interreaction between these resin materials as to create a strong and permanent primary chemical bond therebetween, in addition to any secondary bonds, such as hydrogen bonds and/or van der Waals forces. The present invention also relates to the products involved in and resulting from such methods.

26 Claims, No Drawings

METHODS FOR BONDING DISSIMILAR SYNTHETIC POLYMERIC MATERIALS AND THE PRODUCTS INVOLVED IN AND RESULTING FROM SUCH METHODS

THE FIELD OF THE INVENTION

The present invention relates to methods of making multi-layered products, and more particularly multi-layered sheet materials, such as resilient floor coverings, which comprises a vinyl resin layer and a polyurethane or acrylated polyurethane resin layer, wherein it is necessary that such layers be adhered and bonded together in a strong and permanent bond that resists delamination.

BACKGROUND OF THE INVENTION

It is well known in the manufacture of multi-layered products, such as resilient floor, wall, or ceiling coverings, or resilient desk, table, or counter tops, and the like, that it is often necessary to bond together two or more layers of dissimilar synthetic polymeric materials and that it is often difficult to obtain a strong and permanent bond between such dissimilar synthetic polymeric materials that will successfully resist delamination of the layers.

Such difficulties often are believed to arise in the bonding of such dissimilar synthetic polymeric materials because of differences in surface energies. For example, if atoms from two dissimilar synthetic polymeric materials cannot be close enough to each other, perhaps because of large dissimilarities or disparities in polarity, van der Waals forces cannot be adequately taken advantage of to create strong and permanent bonding that will resist delamination. Nor is it believed that hydrogen bonding can be adequately taken advantage of in such situations. Many proposals have been made heretofore to overcome such difficulties and to improve the bond between such dissimilar synthetic polymeric materials but none has been found to be completely satisfactory to date.

The present invention will be described with particular reference to the bonding of dissimilar synthetic polymeric materials, such as, for example, vinyl resin materials and polyurethane or acrylated polyurethane resin materials but it is to be appreciated that the principles of the present invention are equally applicable to other equivalent dissimilar synthetic polymeric materials. In the same way, the present invention will be described with particular reference to multi-layered decorative sheet materials such as resilient floor coverings, utilizing such dissimilar synthetic polymeric materials but, again, it is to be appreciated that the principles of the present invention are equally applicable to other multi-layered products utilizing such dissimilar synthetic polymeric materials or layers.

In the manufacture of resilient floor coverings, normally a base layer or substrate is laid out in a substantially flat, horizontal condition. Such a base layer or substrate is customarily a felted or matted fibrous sheet or overlapping, intertwined fibers and/or filaments, usually of asbestos or of natural or synthetic or man-made fibers of cellulosic origin, although many other forms of sheets, films, or textile materials and many other fibers and/or filaments may be used.

Upon this substantially flat, horizontal base layer or substrate is then applied a substantially uniform base layer of a liquid or semi-liquid resinous composition containing a synthetic polymeric material, usually an ungelled polyvinyl chloride plastisol, and usually containing a blowing or foaming agent. This liquid or semi-liquid plastisol composition is subsequently heated and gelled at an elevated temperature to a relatively firm condition.

This relatively firm, gelled polyvinyl chloride plastisol may then be printed with a decorative multi-colored pattern or design in which certain predetermined areas may contain a blowing or foaming inhibitor which subsequently modifies the action of the blowing or foaming agent in those certain predetermined areas.

A substantially uniform wear layer of a clear liquid or semi-liquid resinous composition, containing usually another polyvinyl chloride plastisol but normally not containing any blowing or foaming agent is then applied as a wear resistant top coating to the surface of the gelled, printed base layer of polyvinl chloride plastisol and is subsequently gelled and firmed thereon either as a separate operation or jointly in connection with a fusion and blowing or foaming operation of the base layer of polyvinyl chloride plastisol.

Thus far, there is relatively little or no difficulty in creating a strong and permanent bond or adhesion between the base layer of polyvinyl chloride plastisol and the wear layer which is also of polyvinyl chloride plastisol. Such layers just naturally bond together immediately upon contact, followed by the subsequent heating.

It is then frequently desired to provide a top surface coating on top of the surface of the polyvinyl chloride wear layer and such top surface coating is often desired to be a polyurethane or acrylated polyurethane resin coating because of their superior physical and chemical properties and characteristics. However, in many instances, it is found that the bond or adhesion between the vinyl resin material of the wear layer and the polyurethane or acrylated polyurethane resin material of the top surface layer is not as strong or as permanent, as desired, and does not resist delamination as well as desired. It is believed that such is due to the fact that the wear layer material and the top surface coating material are dissimilar synthetic polymeric materials.

PURPOSES AND OBJECTS OF THE INVENTION

It is therefore a principal purpose and object of the present invention to provide for methods of improving the adhesive bond between such dissimilar synthetic polymeric materials, and particularly between a vinyl resin material and a polyurethane or acrylated polyurethane material, whereby a strong and permanent bond or adhesion is created between such dissimilar synthetic polymeric materials.

BRIEF SUMMARY OF THE INVENTION

It has been found that such principal purpose and object, as well as other principal purposes and objects which will become clear from a further reading and understanding of this disclosure, may be achieved by forming a layer or material comprising: (1) a vinyl resin; (2) one or more plasticizers for the vinyl resin; and (3) an acrylate or an acrylated urethane; providing a polyurethane or acrylated polyurethane resin layer or material containing an organic peroxide or other UV or thermal activated free radical initiators; bringing the vinyl resin layer or material and the polyurethane or acrylated polyurethane resin layer or material into contact; and exposing the vinyl resin layer or material and the contacting polyurethane or acrylated polyurethane layer or material to curing conditions in the presence of the organic peroxide or other UV or thermally activated free radical initiator, whereby there is sufficient chemical interreaction between the vinyl resin layer or material and the polyurethane or acrylated polyurethane resin layer or material as to create a strong and permanent primary chemical bond therebetween, in addition to any secondary bonds, such as hydrogen bonds and/or van der Waals forces.

DESCRIPTION OF PREFERRED AND TYPICAL EMBODIMENTS

THE BASE LAYER OR SUBSTRATE

The specific base layer or substrate which is used to illustrate the preferred and typical embodiments of the present invention does not relate to the essence thereof and no detailed description is deemed necessary. It is customarily and conventionally a felted or matted fibrous sheet of overlapping, intertwined fibers and/or filaments, usually of asbestos or of cellulosic origin, although many other forms of sheets, films, or fabrics and many other fibers and/or filaments may be used, such as is described in U.S. Pat. Nos. 3,293,094 and 3,293,108.

THE BASE SYNTHETIC POLYMERIC MATERIAL OR LAYER

The specific base synthetic polymeric material or layer which is used to illustrate the preferred and typical embodiments of the present invention does not relate to the essence thereof and it should be sufficient to state that it may be potentially foamable or non-foamable and that, although a polyvinyl chloride plastisol is preferred and typical, many other synthetic resins are also of use, not only as plastisols but also as organosols or as aqueous latices (aquasols or hydrasols).

THE VINYL RESIN WEAR LAYER

The specific vinyl resin which is used in the preparation of the vinyl resin wear layer does not relate to the essence of the present invention. Although a polyvinyl chloride plastisol is is the preferred embodiment, many other vinyl resins are also of use, such as a vinyl chloride-vinyl acetate copolymer, a vinyl chloride-vinylidene chloride copolymer, or copolymers of vinyl chloride with other vinyl esters such as vinyl butyrate, vinyl propionate, or even alkyl substituted vinyl esters. As usual, plastisols are preferred but organosols and aqueous latices are also of use. Substantially any basic vinyl resin wear layer formulation will suffice, such as those disclosed in the previously cited U.S. Patents, with the modification that there be included in the formulation from about 10 percent by weight to about 30 percent by weight, and preferably from about 15 percent to about 30 percent by weight of an acrylate or an acrylated urethane, or mixtures thereof.

THE ACRYLATES

Specific examples of suitable acrylates which are to be included in the wear layer formulation include the following as illustrative but not limitative: methyl acrylate, ethyl acrylate, butyl acrylate, isobutyl acrylate, allyl acrylate, hexyl acrylate, 2-ethylhexyl acrylate, butoxyethyl acrylate, isodecyl acrylate, benzyl acrylate, cyclohexyl acrylate, 1,3-butylene glycol acrylate, 1,3-butylene glycol diacrylate, 1,4-butanediol diacrylate, diethylene glycol diacrylate, 1,6-hexanediol diacrylate, 2,2-dimethylpropane-1,3-diacrylate, propylene glycol 200 diacrylate, tetraethylene glycol diacrylate, trimethylolpropane triacrylate, pentaerythritol triacrylate, pentaerythritol tetraacrylate, allyl methacrylate, tetrahydrofurfuryl methacrylate, cyclohexyl methacrylate, n-hexyl methacrylate, triethylene glycol dimethacrylate, ethylene glycol dimethacrylate, tetraethylene glycol dimethacrylate, polyethylene glycol dimethacrylate, diethylene glycol dimethacrylate, 1,6-hexanediol dimethacrylate, 1,3-butylene glycol dimethacrylate, trimethylolpropane trimethacrylate, pentaerythritol tetramethacrylate, etc.

THE ACRYLATED POLYURETHANES

The acrylated polyurethanes which are to be included in the vinyl resin wear layer may be prepared by several different conventional methods, preferred and typical methods involving the use of three basic reactants, namely: a polyisocyanate, usually a diisocyanate; a polyfunctional compound such as a polyol, polyamine, etc.; and a hydroxyalkyl acrylate.

For example, a UV reactive acrylated urethane oligomer or polymer may be synthesized, for example, from two basic reactants, the first being a conventional isocyanate-function terminated polyurethane (the reaction product of a stoichiometric excess of a polyisocyanate (including di-, tri- and tetra-isocyanates and mixtures thereof) with a polyfunctional compound, such as polyols, including diols, triols, tetrols, and mixtures thereof, as well as ether-type polyols, ester-type polyols, polyamines, hydroxyamines, polymercaptans, and mixtures thereof) and the other reactant being a hydroxyalkyl acrylate, whereby an essentially polyurethane structure having terminal acrylate functionality is obtained.

THE POLYISOCYANATES

The polyisocyanates used in preparing the conventional isocyanate-function terminated polyurethane used in carrying out the principles of the present invention include: 4,4'-methylene-bis-cyclohexyl diisocyanate, hexamethylene-1,6-diisocyanate, tetramethylene-1,4-diisocyanate, cyclohexane-1,4-diisocyanate, 2,2,4-trimethyl-1,6-hexane diisocyanate, trimethyl hexamethylene diisocyanate, dimer acid diisocyanate, trimer of hexamethylene diisocyanate, ethylene diisocyanate, ethylidene diisocyanate, 2,4-tolylene diisocyanate, 2,6-tolylene diisocyanate, p-phenylene diisocyanate, m-phenylene diisocyanate, 4,4'-methylene bis-(phenylisocyanate), naphthylene-1,5-diisocyanate, 4,4'-biphenylene diisocyanate, furfurlidene diisocyanate, butane-1,4-diisocyanate, isophorone diisocyanate, pentane-1,5-diisocyanate, etc.

THE POLYFUNCTIONAL COMPOUND

The polyfunctional compounds which are employed to react with any of the above-listed polyisocyanates or mixtures thereof may be selected from a large group of suitable chemical compounds of which the following are illustrative but not limitative:

Diols such as ethylene glycol, propylene glycol, butylene glycol, trimethylene glycol, tetramethylene glycol, pentamethylene glycol, hexamethylene glycol, neopentyl glycol, etc.; triols such as glycerol, 1,1,1-trimethyol propane, 1,1,1-trimethylol ethane, 1,2,3-butanetriol, 1,2,4-butanetriol, 1,2,3-pentanetriol, 1,2,3-hexanetriol, 1,2,4-hexanetriol, 1,2,5-hexanetriol, 1,2,6-hexanetriol, 2,3,4-hexanetriol, 1,3,6-hexanetriol, etc.; tetrols such as erythritol, pentaerythritol, etc.; ether-type polyols which are adduct products of the above polyols with alkylene oxides having from 2 to 5 carbon atoms, such as ethylene oxide, propylene oxide, trimethylene oxide, 1,2-butylene oxide, isobutylene oxide, 1,4-tetramethylene oxide, pentamethylene oxide, and mixtures thereof, and especially diethylene glycol, triethylene glycol, tetraethylene glycol, pentaethylene glycol, and higher molecular weight polyalkylene glycols having the general formula $HO(C_nH_{2n})_xOH$, etc,; ester-type polyols which are condensation products of the above polyols with polycarboxylic acids such as oxalic, malonic, succinic, glutaric, pimelic, suberic, azelaic, sebacic, fumaric, phthalic, isophthalic, terephthalic, mellitic, etc.; polyamines such as ethylene diamine, propylene diamine, trimethylene diamine, tetramethylene diamine, pentamethylene diamine, hexamethylene diamine, diethylene diamine, triethylene diamine, tetraethylene diamine, tetraethylene pentamine, isophorone diamine, piperazine, etc.; poly mercaptans such as ethylene dimercaptans, 1,3-propanedithiol, 1,4-butanedithiol, 2,2-dimercaptodiethyl ether, glycol dimercapto acetate, glycerol dimercapto propionate, trimethylolpropane tri(3-mercapto propionate) etc.; hydroxyamines such as monoethanolamine, diethanolamine, 3-aminopropanol-1, 4-aminobutanol-1, etc.; hydroxymercaptans such as 1-thioglycerol, 2-thioglycerol, 2-mercaptoethanol, 2,3-dimercapto propanol-1, etc.

THE HYDROXYALKYL ACRYLATES

Examples of preferred and typical hydroxyalkyl acrylates include: hydroxymethyl acrylate, hydroxyethyl acrylate, hydroxypropyl acrylate, and mixtures thereof. If desired, the hydroxyalkyl acrylates may be replaced by hydroxyalkyl methacrylates or by hydroxyalkyl-containing vinyl compounds to yield essentially polyurethane structures having terminal methacrylate or vinyl functionality. Examples of preferred and typical hydroxymethacrylates are: hydroxyethyl methacrylate, hydroxymethyl methacrylate, hydroxypropyl methacrylate, and mixtures thereof. Examples of preferred and typical hydroxyalkyl-containing vinyl compounds include: B-hydroxyethyl vinyl ether, B-hydroxyethyl sulfide, etc.

The acrylated polyurethane resins may also be made by other conventional methods disclosed in the prior art, such as those disclosed in U.S. Pat. No. 4,100,318 which issued on July 11, 1978.

The thickness of the substantially uniformly applied vinyl resin wear layer is the range of from about 0.001 inch to about 0.030 inch, and preferably from about 0.005 inch to about 0.025 inch.

The vinyl resin wear layer containing the added acrylates or the acrylated polyurethanes, or mixtures thereof is then passed through a heated oven maintained at an elevated temperature of about 250° F. to about 460° F. and preferably from about 270° F. to about 450° F. for a period of time of from about 1½ minutes to about 10 minutes and preferably from about 2 minutes to about 8 minutes whereupon the vinyl resin in the wear layer gels and fuses and the vinyl resin in the base synthetic polymeric plastisol layer fuses, accompanied by the blowing and foaming thereof.

THE TOP SURFACE COATING

The polyurethane or the UV curable acrylated polyurethane resin which is used in the formulation of the top surface coating that is applied to the vinyl resin wear layer does not relate to the essence of the present invention. The polyurethane resin may be any conventional polyurethane resin and the UV curable polyurethane resin may be the same as that previously included in the vinyl resin wear layer or it may be a different UV curable acrylated polyurethane. However, regardless of which resin is used and regardless of the precise method of its manufacture or the precise components which enter its formulation, there must be from about 0.5 percent to about 20 percent by weight of free available isocyanate therein, and preferably from about 2 percent to about 10 percent by weight, based on the total weight of the top surface layer formulation.

Additionally, there is included in the top surface layer formulation from about 0.5 percent by weight to about 20 percent by weight, and preferably from about 2 percent by weight to about 10 percent by weight of a free radical polymerization initiator, or catalyst, such as an organic peroxide, such percentages being based on the total weight of the top surface layer formulation.

THE FREE RADICAL POLYMERIZATION INITIATOR

Specific free radical polymerization initiators, or catalysts, notably organic peroxides, useful for the application of the principles of the present invention include the following, as illustrative but not limitative: di-t-butyl peroxide, 2,5-dimethyl-2,5-bis(t-butylperoxy)hexane, 2,5-dimethyl-2,5-bis(t-butylperoxy)hexyne-3, di-t-amyl peroxide, t-butyl-2-hydroxyethyl peroxide, a,a'-bis(t-butylperoxy)diisopropyl benzene, benzoyl peroxide, diisobutyryl peroxide, 2,4-dichlorobenzoyl peroxide, diisononanoyl peroxide, decanoyl peroxide, lauroyl peroxide, acetyl peroxide, succinic acid peroxide, bis-p-chlorobenzoyl peroxide, 2,5-dihydroperoxy-2,5-dimethylhexane, cumene hydroperoxide, t-butyl hydroperoxide, p-menthane hydroperoxide, diisopropylbenzene hydroperoxide, 1,1,3,3-tetranethyl butyl hydroperoxide, dicumyl peroxide, di(n-propyl)peroxy dicarbonate, diisopropyl peroxydicarbonate, di(sec-butyl)peroxydicarbonate, di(2-ethylhexyl) peroxydicarbonate, dicyclohexyl peroxydicarbonate, dicetyl peroxydicarbonate, bis-(4-t-butylcyclohexyl)peroxydicarbonate, t-butylperoxy isopropyl monocarbonate, 2,2-azobis-(isobutyronitrile), 1,1-bis(t-butylperoxy-3,3,5-trimethylcyclohexane, t-butyl peroxyacetate, t-butyl peroxyisobutyrate, t-butyl peroxy-2-ethylhexanoate, t-butyl peroxy pivalate, t-butyl peroxyneodecanoate, t-butyl peroxymaleic acid, di-t-butyl diperoxyphthalate, 2,5-dimethyl-2,5-bis(benzoylperoxy)hexane, 2,3-dimethyl-bis(octanoylperoxy)hexane, t-butyl peroctoate, t-butyl perbenzoate, acetylcyclohexyl sulfonyl peroxide, acetyl sec-heptyl sulfonyl peroxide, 2-t-butylazo-2-cyano-4-methoxy-4-methyl pentane, 2-t-butylazo-2-cyano-4-methyl pentane, 2-t-butylazo-2-cyanopropane, methyl ethyl ketone peroxide, 2,4-pentanedione peroxide, cyclohexanone peroxide, etc.

It is to be noted that, if the free radical polymerization initiator, or catalyst, or organic peroxide, is a powdered material, such as lauroyl peroxide, for example, it should be dissolved in a small amount of a suitable solvent, such as vinyl acetate, for example, prior to actual use. If the free radical polymerization initiator, or catalyst, or organic peroxide, is a liquid, it may be used directly in that form.

The thickness of the applied top coating layer is normally in the range of from about 1 mil to about 15 mils, depending upon the future requirements of the product being made.

Curing conditions for acrylated polyurethane resins differ from those normally employed for more conventional polyurethane resins, in that the acrylated polyurethane resin is cured by being passed through an actinic radiation source, such as, for example, an ultraviolet lamping unit oven. Radiation curing by electron beam, gamma and x-ray treatment, and other suitable sources may be employed. Ultraviolet radiation is the preferred and typical source. In the presence of photoinitiators, such radiation induces a photo-chemical reaction which produces free radicals which are capable of inducing polymerization. Sources of ultraviolet radiation may be mercury vapor arc lamps, plasma arcs, pulses xenon lamps and carbon arcs. Mercury vapor lamps are preferred and typical for most cases. Special wavelengths of light which are most effective will vary, depending primarily upon the particular acrylated polyurethane coating used and the particular photo-sensitizer employed. In some instances, combinations of conventional thermal and radiation curing conditions may be used.

During the actinic radiation curing conditions, polymerization of the acrylated polyurethane materials takes place, along with polymerization of other resinous materials which are present, and with sufficient chemical inter-reaction between the acrylates or acrylated polyurethanes in the vinyl resin wear layer and the polyurethanes and acrylated polyurethanes in the top surface layer as initiated by the free radical polymerization initiator or the organic peroxide in the top coating layer. As a result, there is created a strong and permanent primary chemical bond between the vinyl resin wear layer and the polyurethane or acrylated polyurethane resin layer which is additional to any existing secondary bonds, such as hydrogen bonds or van der Waals forces. Such a strong and permanent bond is capable of resisting delamination forces very well.

The invention will be further described in greater detail by the following specific working examples. Although these examples may described in very particular detail some of the more specific features of the present invention, they are given primarily for purposes of illustration and the invention in its broader aspects is not to be considered as limited thereto.

EXAMPLE I

The base layer or substrate comprises a realtively flat, 0.040 inch thick fibrous sheet of felted or matted asbestos fibers with an acrylic smoothing or leveling coating thereon. The asbestos fiber sheet is coated with a substantially uniform coating to a thickness (wet) of about 0.015 inch with the following potentially foamable polyvinyl chloride plastisol composition:

| | Parts |
|---|---|
| Polyvinyl chloride, low mol. wt., general purpose dispersion resin, inh. vis. 0.99 (ASTM D-1243-66) | 30.2 |
| Polyvinyl chloride, med. mol. wt., dispersion grade resin, inherent viscosity 1.0 | 8.2 |
| Polyvinyl chloride, med. mol. wt., blending resin, inherent viscosity 0.9 | 17.1 |
| Anhydrous alumin silicate filler | 6.9 |
| Alkyl benzyl phthalate plasticizers | 24.7 |
| Polydodecyl benzene | 7.4 |
| Azodicarbonamide | 1.1 |
| Accelerator/stabilizer | 0.4 |
| Titanium dioxide | 2.5 |

-continued

| | Parts |
|---|---|
| Dioctyl phthalate | 1.5 |
| Wetting agent | 0.03 |
| (Parts by weight) | |

Gelling and firming of the potentially foamable polyvinyl chloride plastisol is accomplished in an oven atmosphere which is maintained at an elevated temperature of about 300° F. for a period of time of about 3 minutes. The temperature is not that elevated as to activate or decompose the blowing or foaming agent which is present.

The gelled, firmed potentially foamable polyvinyl chloride plastisol is then printed with a multicolored decorative pattern or design using (1) a conventional or standard printing ink composition and (2) an inhibitor-containing printing ink composition, as follows:

| | Parts |
|---|---|
| Printing ink composition (1): | |
| Solution grade copolymer of vinyl chloride (90 parts) and vinyl acetate (10 parts) | 15 |
| Methyl ethyl ketone | 85 |
| Pigment or colorant, as desired | |
| Printing ink composition (2): | |
| Solution grade copolymer of vinyl chloride (90 Parts) and vinyl acetate (10 parts) | 12 |
| Methyl ethyl ketone | 68 |
| Trimellitic anhydride | 20 |
| Pigment or colorant, as desired | |

The printed, gelled and firmed potentially foamable polyvinyl chloride plastisol is then allowed to air-dry and a polyvinyl chloride plastisol wear layer is substantially uniformly applied thereto to a wet thickness of about 0.015 inch depth and having the following formulation by weight:

| | Parts |
|---|---|
| Polyvinyl chloride, dispersion grade, high mol. wt. | 89.36 |
| Polyvinyl chloride, blending resin, inherent viscosity 0.86 (ASTM D-1243-66) | 10.64 |
| Butyl benzyl phthalate plasticizer | 7.5 |
| 2,2,4-trimethyl-1,3-pentanediol diisobutyrate | 7.5 |
| Polyethylene glycol dimethacrylate | 30.0 |
| Epoxy plasticizer | 5.0 |
| Ba—Zn stabilizer | 3.0 |
| Toner | 0.21 |
| UV absorber | 0.32 |

Gelling and firming of the polyvinyl chloride plastisol wear layer takes place at an elevated temperature of about 300° F. for a period of time of about 3 minutes, followed by fusing, blowing or foaming at a more elevated temperature of about 430° F. for a period of about 1 minute and 40 seconds.

The base synthetic polymeric layer and the wear layer having cooled, they are subsequently pre-warmed to an elevated temperature of about 260° F. before being substantially uniformly coated with a UV curable acrylated urethane top surface coating having the following composition by weight:

| | Parts |
|---|---|
| Lauroyl peroxide | 5 |
| Acrylated urethane resin | 60 |

-continued

| | Parts |
|---|---|
| Polyether polyol 650 | 10 |
| Vinyl acetate | 30 |
| Isobutyl ether of benzoin photoinitiator | 3% |
| Dibutyl tin dilaurate | 0.5% |

The curing of the UV curable acrylated urethane resin top coating takes place by passage through an ultraviolet unit having a length of about 3 feet (2 lamp parallel unit, 12 inches long, 200 watts each lamp, medium pressure, mercury lamp) and a nitrogen atmosphere at a rate of about 10 feet per minute.

The adhesion or bond between the vinyl resin wear layer and the acrylated polyurethane resin top coating layer is tested and is found to be strong and permanent and capable of resisting delamination very well. The results are generally comparable to the results obtained in repeated tests.

EXAMPLE II

The procedures described in Example I are followed substantially as set forth therein with the exception that the formulation of the vinyl resin wear layer is changed to the following:

| | Parts |
|---|---|
| Polyvinyl chloride, dispersion grade, high mol. wt. | 89.36 |
| Polyvinyl chloride, blending resin, inh. vis. 0.86 | 10.63 |
| Butyl benzyl phthalate plasticizer | 7.5 |
| 2,2,4-trimethyl-1,3-pentanediol diisobutyrate | 15.0 |
| Polyethylene glycol dimethacrylate | 22.5 |
| Epoxy plasticizer | 5.0 |
| Ba—Zn stabilizer | 3.0 |
| Toner | 0.21 |
| UV absorber | 0.32 |

The adhesion or bond between the vinyl resin layer and the acrylated polyurethane resin top coating layer is tested and is found to be strong and permanent and to resist delamination very well. The results are generally comparable to the results of Example I.

EXAMPLE III

The procedures described in Example I are followed substantially as set forth therein with the exception that the formulation of the vinyl resin wear layer is changed to the following composition by weight:

| | Parts |
|---|---|
| Polyvinyl chloride, dispersion grade, high mol. wt. | 89.36 |
| Polyvinyl chloride, blending resin, inh. vis. 0.86 | 10.63 |
| Epoxy plasticizer | 5.0 |
| Ba—Zn stabilizer | 3.0 |
| Trimethylol propane trimethacrylate | 45.0 |
| Butyl benzyl phthalate plasticizer | 6.0 |
| Toner | 0.21 |
| UV absorber | 0.32 |

The adhesion or bond between the vinyl resin wear layer and the acrylated polyurethane resin top coating layer is tested and is found to be excellent and capable of resisting delamination very well. The results are generally comparable to those of Example I.

EXAMPLE IV

The procedures described in Example I are followed substantially as set forth therein with the exception that the lauroyl peroxide in the UV curable acrylated polyurethane resin top coating layer is replaced by 10 parts of t-butylperoxy isopropyl monocarbonate as the free radical polymerization initiator.

The results are generally comparable to the results obtained in Example I. The adhesion of the bond between the vinyl resin layer and the acrylated polyurethane top surface coating is tested and is found to be excellent and to resist delamination very well.

EXAMPLE V

The procedures of Example I are followed substantially as set forth therein with the exception that the lauroyl peroxide is replaced by dicumyl peroxide as the free radical polymerization initiator.

The results of this Example are found to be generally comparable to the results obtained in Example I. The bond or adhesion between the vinyl resin layer and the acrylated polyurethane layer is tested and is found to be excellent and well capable of resisting delamination.

EXAMPLE VI

The procedures described in Example I are followed substantially as set forth therein with the exception that the polyethylene glycol dimethacrylate in the wear layer formulation is replaced by an equal amount of methoxy polyethylene glycol 300 mono-acrylate.

The results of this Example are generally comparable to the results obtained in Example I. The bond or adhesion between the vinyl resin wear layer and the acrylated polyurethane resin layer is tested and found to be excellent.

EXAMPLE VII

The procedures described in Example I are followed substantially as set forth therein with the exception that the polyethylene glycol dimethacrylate in the vinyl resin wear layer is replaced by an acrylic urethane prepared by reacting 4,4'-methylene-bis-cyclohexyl diisocyanate and Teracol 650 polytetramethylene ether glycol, and hydroxyethyl methacrylate.

The results of this Example are generally comparable to the results obtained in Example I. The bond or adhesion between the vinyl resin wear layer and the acrylated polyurethane resin layer is tested and is found to be excellent and to resist delamination very well.

EXAMPLE VIII

The procedures described in Example I are followed substantially as set forth therein with the exception that the polyethylene glycol dimethacrylate is replaced by an acrylated polyurethane resin derived from reacting 4,4'-methylene-bis-cyclohexyl diisocyanate, Pluracol 450 polyoxyalkylene polyol based on pentaerythritol, and hydroxy ethyl methacrylate.

The results of this Example are generally comparable to the results of Example I. The bond between the vinyl resin wear layer and the acrylated polyurethane resin layer is tested and found to be excellent and well capable of resisting delamination.

EXAMPLE IX

The procedures described in Example I are followed substantially as set forth therein with the exception that the polyethylene glycol dimethacrylate is replaced by an acrylated polyurethane resin derived by reacting isophorone diisocyanate, Teracol 550 polytetramethylene ether glycol, and hydroxyethyl methacrylate.

The results of this Example are generally comparable to the results obtained in Example I. The bond or adhesion between the vinyl resin wear layer and the acrylated polyurethane resin layer is tested and is found to be excellent and well capable of resisting delamination.

EXAMPLE X

The procedures described in Example VII are followed substantially as set forth therein with the exception that the hydroxyethyl methacrylate used in the formation of the acrylated polyurethane for the vinyl resin wear layer is replaced by hydroxyethyl acrylate.

The results of this Example are generally comparable to the results obtained in Example VII. The bond or adhesion between the vinyl resin wear layer and the acrylated polyurethane resin top coating layer is tested and is found to be excellent and well capable of resisting delamination.

EXAMPLE XI

The procedures described in Example VII are followed substantially as set forth therein with the exception that the hydroxyethyl methacrylate used in the formulation of the acrylated polyurethane for the vinyl resin wear layer is replaced by hydroxypropyl acrylate.

The results of this Example are generally comparable to the results obtained in Example VII. The bond or adhesion between the vinyl resin wear layer and the acrylated polyurethane top coating layer is tested and is found to be excellent and well capable of resisting delamination.

EXAMPLE XII

The procedures set forth in Example I are followed substantially as described therein with the added definition that the acrylated urethane resin used in the top surface coating is the reaction product of: (XXIIa) 4,4′-methylene-bis-cyclohexyl diisocyanate, polytetramethylene ether glycol, and hydroxyethyl acrylate; (XIIb) 4,4′-methylene-bis-cyclohexyl diisocyanate, polyoxyalkylene polyol based on pentaerythritol, and hydroxyethyl methacrylate; (XIIc) isophorone diisocyanate, polytetramethylene ether glycol, and hydroxymethacrylate; (XIId) isophorone diisocyanate, polyoxyalkylene polyol based on pentaerythritol, and hydroxyethyl methacrylate; (XIIe) 4,4′-methylene-bis-cyclohexyl diisocyanate, polytetramethylene ether glycol, and hydroxymethyl acrylate; (XIIf) 4,4′-methylene-bis-cyclohexyl diisocyanate, polytetramethylene ether glycol, and hydroxypropyl methacrylate.

The results of these Examples are all generally comparable to the results obtained in Example I. The bond or adhesion between the vinyl resin wear layer and the acrylated polyurethane resin top surface coating layer is strong and permanent and is capable of resisting delamination very well.

EXAMPLE XIII

The procedures of Example I are followed substantially as set forth therein with the exception that a different top surface coating layer is used which is formulated as follows: a conventional polyurethane resin is prepared from an aliphatic diisocyanate (hexamethylene diisocyanate) as the NCO source; the reacting polyhydroxy groups are provided for by a mixture of polyols (both polyester polyol types and polyether polyol types, with the polyesters forming the major proportion and the polyethers forming the minor proportion), and the catalyst being a mixture of tetrakis-2 hydroxypropyl ethylene diamine, a tertiary amine, and dibutyl tin dilaurate. Five percent by weight of lauroyl peroxide is included as the organic peroxide.

The conventional polyurethane resin top surface coating layer is applied to the vinyl resin wear layer and is subsequently heated in an oven at an elevated temperature of about 385° F. for a period of time of about 2 minutes and 45 seconds. Fusion takes place, along with the blowing and foaming of the polyvinyl chloride base synthetic polymeric layer containing the blowing or foaming agent.

The results of this Example are generally comparable to the results obtained in Example I. The bond or adhesion between the vinyl resin wear layer and the polyurethane resin top surface coating layer is tested and is found to be strong and permanent and capable of resisting delamination very well.

Although several specific working Examples of the inventive concept have been described in particularity, the invention in its broader aspects should not be construed as limited thereto but should be considered as including various other equivalent features as set forth and encompassed by the appended claims. Any suitable changes, modifications and variations may be made without departing from the scope and the spirit of such appended claims.

What is claimed:

1. A multi-layered construction of two dissimilar synthetic polymeric materials comprising a first layer of a vinyl resin and at least one plasticizer for said vinyl resin and from about 10 percent by weight to about 30 percent by weight of a member of the group consisting of acrylates or acrylated polyurethanes, and a second layer covering said first layer of a synthetic polymeric material containing a member of the group consisting of polyurethanes and acrylated polyurethanes, and from about 0.5 percent by weight to about 20 percent by weight of a free radical polymerization initiator capable of initiating a polymerization reaction between said acrylates or acrylated polyurethanes in said first layer and said polyurethanes or acrylated polyurethanes in said second layer, both of said layers having one surface in contact with one surface of the other layer throughout substantially their entire one surface areas and being bonded throughout substantially all of said surface areas in a strong and permanent primary chemical bond therebetween by a reaction product of a polymerization involving said polyurethanes or acrylated polyurethanes in said first layer and a synthetic polymeric material containing a member of the group consisting of polyurethanes or acrylated polyurethanes containing from about 0.5 percent by weight to about 20 percent by weight of free available isocyanate in said second layer.

2. A multi-layered construction as defined in claim 1 wherein said free radical polymerization initiator is an organic peroxide.

3. A multi-layered construction as defined in claim 1 wherein said free radical polymerization initiator is lauroyl peroxide.

4. A multi-layered construction as defined in claim 1 wherein said free radical polymerization initiator is t-butylperoxy isopropyl monocarbonate.

5. A multi-layered construction as defined in claim 1 wherein said polyurethane in said synthetic polymeric material is a reaction product of a diisocyanate and a polyol.

6. A multi-layered construction as defined in claim 1 wherein said acrylated polyurethane in said synthetic polymeric material is a reaction product of a diisocyanate, a polyol, and a hydroxyalkyl acrylate.

7. A multi-layered construction as defined in claim 1 wherein said vinyl resin in said first synthetic polymeric material is polyvinyl chloride.

8. A multi-layered construction as defined in claim 1 wherein said acrylate in said viny resin composition is methoxy polyethylene glycol mono-acrylate.

9. A multi-layered construction as defined in claim 1 whereinsaid acrylated polyurethane in said first layer is a reaction product of a diisocyante, a polyol, and a hydroxyalkyl methacrylate.

10. A multi-layered construction as defined in claim 1 wherein said acrylated polyurethane is said first layer is a reaction product of a diisocyanate, a polyol, and a hydroxyalkyl acrylate.

11. A multi-layered construction as defined in claim 1 wherein first layer is substantially free of blowing or foaming agents and is substantially unblown or unfoamed.

12. A mutli-layered construction as defined in claim 1 wherein said second layer is substantially free of blowing or foaming agents and is substantially unblown or unfoamed.

13. A multi-layered construction as defined in claim 1 wherein said first layer containing said polymerizable acrylates or acrylated polyurethanes has a substantially uniform thickness of from about 0.001 inch to about 0.030 inch.

14. A multi-layered construction as defined in claim 1, wherein the polymerization reaction initiated by said free radical polymerization initiator involves dissimilar monomeric materials.

15. A multi-layered construction as defined in claim 14, wherein the reactant in said first layer is an acrylate and the reactant in said second synthetic polymeric material is an acrylated polyurethane.

16. A multi-layered construction as defined in claim 15, wherein said acrylate in said first layer is polyethylene glycol dimethyacrylate.

17. A multi-layered construction as defined in claim 15, wherein said acrylated polyurethane in said synthetic polymeric second-layer is derived from a diisocyanate; a polyol, and hydroxyethyl acrylate.

18. A multi-layered construction as defined in claim 15, wherein said acrylated polyurethane in said synthetic polymeric material is derived from a diisocyanate, a polyol, and hydroxyethyl methacrylate.

19. A method of improving the bond between a vinyl resin material and a member of the group consisting of polyurethane and acrylated polyurethane resin materials which comprises: including from about 10 percent by weight to about 30 percent by weight of a member of the group consisting of acrylates and acrylated polyurethanes in said vinyl resin material: providing from about 0.5 percent by weight to about 20 percent by weight of a free radical polymerization initiator in said polyurethane or acrylated polyurethane resin material, said polyurethane or acrylated polyurethane resin material containing from about 0.5 percent by weight to about 20 percent by weight of free available isocyanate; bringing said vinyl resin material and said polyurethane or acrylated polyurethane resin material into contact; and exposing said vinyl resin material and said polyurethane or acrylated polyurethane resin material to curing conditions, whereby there is sufficient chemical inter-reaction between said resin materials as to create a strong and permanent chemical bond therebetween in addition to any hydrogen bonds of van der Waals forces.

20. A method as defined in claim 19 wherein a polyurethane resin material is used and curing conditions take place at elevated temperatures of from about 260° F. to about 410° F. for a period of time of from about 1 minute to about 8 minutes.

21. A method as defined in claim 19 wherein an acrylated resin material is used and curing conditions take place at elevated temperatures by means of radiation curing techniques.

22. A method as defined in claim 19 wherein an acrylated resin material is used and curing conditions take place by means of mercury vapor arc radiation curing.

23. A method as defined in claim 19 wherein an acrylated resin material is used and curing conditions take place by means of medium pressure, mercury arc radiation curing.

24. A method as defined in claim 19, wherein said vinyl resin material is exposed to elevated temperatures sufficient to fuse said vinyl resin material prior to bringing said vinyl resin material and said polyurethane or acrylated polyurethane resin material into contact.

25. A multi-layered construction as defined in claim 19 comprising a layer of a base synthetic polymeric material to which said first layer containing said polymerizable acrylates or acrylated polyurethanes is substantially uniformly applied and adhered.

26. A multi-layered construction as defined in claim 25 wherein said base synthetic polymeric material contains a blowing or foaming agent and is blown or foamed.

* * * * *